(12) United States Patent
Gamzu et al.

(10) Patent No.: US 12,020,690 B1
(45) Date of Patent: Jun. 25, 2024

(54) ADAPTIVE TARGETING FOR PROACTIVE VOICE NOTIFICATIONS

(71) Applicant: Amazon Technologies, Inc., Seattle, WA (US)

(72) Inventors: Iftah Gamzu, Tel Aviv (IL); Marina Haikin, Tel Aviv (IL); Nissim Halabi, Ramat Gan (IL); Yossi Shasha, Ramat Gan (IL); Yochai Zvik, Modiin (IL); Moshe Peretz, Ramat Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 17/489,250

(22) Filed: Sep. 29, 2021

(51) Int. Cl.
*G10L 15/08* (2006.01)
*G06N 20/00* (2019.01)
*G06Q 30/0601* (2023.01)
*G10L 21/00* (2013.01)

(52) U.S. Cl.
CPC ............. *G10L 15/08* (2013.01); *G06N 20/00* (2019.01); *G06Q 30/0631* (2013.01); *G10L 21/00* (2013.01)

(58) Field of Classification Search
CPC ......... G10L 15/08; G10L 21/00; G06N 20/00; G06Q 30/0631
See application file for complete search history.

(56) References Cited

U.S. PATENT DOCUMENTS

| | | | | |
|---|---|---|---|---|
| 10,373,118 B1 * | 8/2019 | Lefkow | ............... | G06Q 10/0875 |
| 11,567,788 B1 * | 1/2023 | Khemka | ............. | G06Q 10/109 |
| 2007/0072156 A1 * | 3/2007 | Kaufman | ............... | G16H 20/60 |
| | | | | 434/236 |
| 2010/0070282 A1 * | 3/2010 | Cho | ......... | G10L 13/00 |
| | | | | 704/260 |
| 2017/0116552 A1 * | 4/2017 | Deodhar | ............ | G06Q 10/0639 |
| 2017/0316320 A1 * | 11/2017 | Jamjoom | ............. | G06Q 10/109 |
| 2018/0190264 A1 * | 7/2018 | Mixter | .................... | H04L 67/55 |

(Continued)

OTHER PUBLICATIONS

Cha, Narae, et al. "Hello there! is now a good time to talk? Opportune moments for proactive interactions with smart speakers." Proceedings of the ACM on Interactive, Mobile, Wearable and Ubiquitous Technologies 4.3 (2020): pp. 1-28 (Year: 2020).*

(Continued)

*Primary Examiner* — Jesse S Pullias
*Assistant Examiner* — Michael C. Lee
(74) *Attorney, Agent, or Firm* — K&L Gates LLP

(57) ABSTRACT

Devices and techniques are generally described for adaptive targeting for voice notifications. In various examples, first data representing a predicted likelihood that a first user will interact with first content within a predefined amount of time may be received. A first set of features including features related to past voice notifications sent to the first user may be determined. A second set of features including features related to interaction with the first content when past voice notifications were sent may be received. A first machine learning model may generate a prediction that a voice notification will increase a probability that the first user interacts with the first content based on the first data, the first set of features, and the second set of features. Audio data comprising the voice notification may be sent to a first device associated with the first content.

20 Claims, 11 Drawing Sheets

(56) References Cited

U.S. PATENT DOCUMENTS

| | | | |
|---|---|---|---|
| 2018/0204256 A1* | 7/2018 | Bifolco | G06Q 30/0625 |
| 2018/0277108 A1* | 9/2018 | Badr | G10L 15/1822 |
| 2019/0342339 A1* | 11/2019 | Nanda | G06F 21/62 |
| 2021/0073920 A1* | 3/2021 | Wang | G06Q 40/12 |
| 2021/0117214 A1* | 4/2021 | Presant | H04L 67/535 |
| 2021/0249018 A1* | 8/2021 | Shin | G10L 15/16 |
| 2023/0123879 A1* | 4/2023 | Zhou | G06T 7/75 |
| | | | 705/333 |

OTHER PUBLICATIONS

Miksik, Ondrej, et al. "Building proactive voice assistants: When and how (not) to interact." arXiv preprint arXiv:2005.01322 (May 4, 2020), pp. 1-17 (Year: 2020).*

* cited by examiner

ADAPTIVE TARGETING FOR PROACTIVE VOICE NOTIFICATIONS

BACKGROUND

Automatic speech recognition (ASR) combined with natural language processing techniques may enable voice interaction between a user and a speech processing system. For example, natural language processing systems may enable a computing device to retrieve and process commands from a user based on the user's spoken commands. In various examples, a natural language processing system may use a text to speech (TTS) component to generate audio data representing human speech in order to engage in spoken dialog with the user. In some cases, natural language processing enabled devices may use such dialog capability to provide spoken notifications to a user. For example, a natural language processing enabled device may provide news updates, calendar updates, information concerning a state of one or more devices, etc.

DETAILED DESCRIPTION

Figure 1:
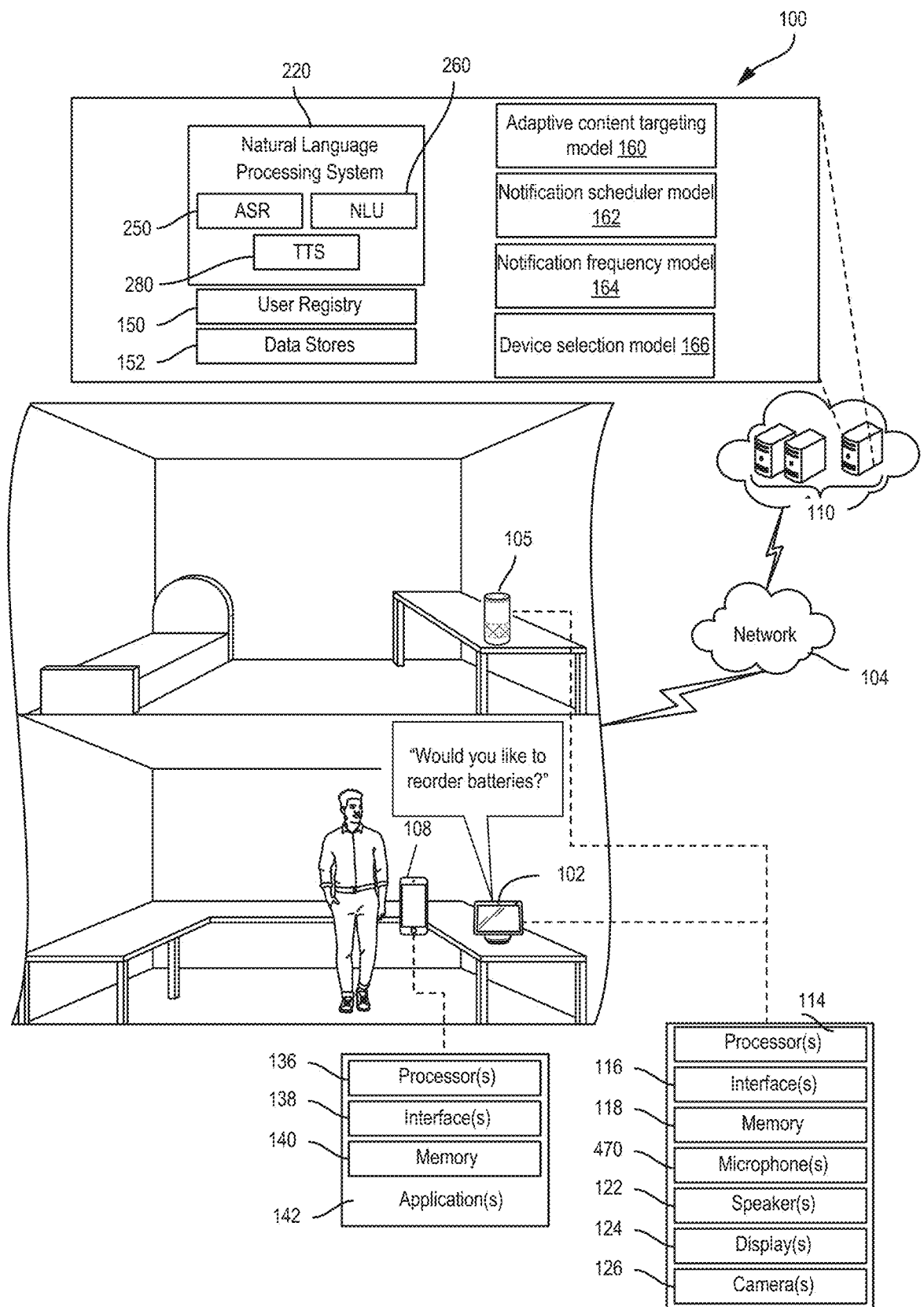
FIG. 1 is a block diagram illustrating an example environment for adaptive targeting for proactive voice notifications, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Natural language processing-enabled virtual assistants aim to reduce the time and effort of users during their day-to-day activities. For example, such virtual assistants may be able to answer questions, play music or video, control operation of network-connected devices, perform online shopping tasks, etc. In some examples, natural language processing-enabled devices may output audio notifications effective to alert the user to some information. For example, a user may configure an alert to occur upon a triggering event. For example, when a stock price drops below a certain value, a user may configure a notification to be output that alerts the user to the event. In some other cases, natural language processing systems may send proactive voice notifications to users. The proactive voice notifications may relate to content. For example, a proactive voice notification may invite the user to play a particular song, reorder a previously-ordered item, add a calendar entry, etc. In some cases, proactive voice notifications may require some response from the user in order to interact with the content and/or perform an action. For example, a proactive voice notification may state, "Based on your listening history, you might enjoy the new album by [Artist_Name]? Would you like to play it?" In this example, the user will have to respond with "Yes" or otherwise provide a command in order to initiate playback of the song. A voice notification may be a notification that is output using a text to speech (TTS) component of the natural language processing system that audio data including synthesized human speech. An example of a proactive voice notification may include a notification indicating that a user may likely want to reorder a particular item from an e-commerce service that the user tends to reorder on a repeating basis. However, in order to provide positive user experiences, it may be important to determine when to send such proactive voice notifications and when not to send such proactive voice notifications.

In various examples described herein, systems and techniques are used to determine whether to send proactive voice notifications to users. In some examples, the decision of whether to send a proactive voice notification may depend on particular content to which the potential voice notification pertains as well as on the particular user's preferences. For example, some users may prefer to receive reminders to reorder particular items (or notifications related to other types of content such as breaking news, new content on a channel to which the user subscribes, etc.), while other users may find such reminders annoying and may prefer to receive them infrequently (or not at all). In some other examples, systems and techniques are described for determining an appropriate time at which to send proactive voice notifications. As described in further detail below, machine learning based approaches may be used to determine a time at which the user tends to interact with the natural language processing system and/or times at which the user tends to "consume" (e.g., issue a command to cause output) proactive voice notifications (among other signals).

As used herein, "consuming" a proactive voice notification refers to playing back an audio notification, requesting that a text notification be displayed, and/or otherwise outputting a given proactive notification (whether text-based, visual, and/or audio-based). In many examples, the user may request that the proactive voice notification be played and thereby may "consume" it. However, in other examples, the proactive voice notification may be consumed (e.g., output) without the user specifically requesting playback of the proactive voice notification. For example, the proactive voice notification may be provided following a different type of user interaction with a virtual assistant. For example, a user may ask "Alexa, what is the weather" to which the personal assistant may respond, "Currently it's 60 degrees and sunny . . . by the way, it looks like you might be running low on bathroom tissue. If you would like to order some, say 'reorder bathroom tissue.'" In this example, the proactive voice notification related to the content "bathroom tissue" is provided after the user receives weather information from the virtual assistant. Further, in some examples, context may be added to the proactive voice notification. In the foregoing example, if the response to the user's request about the weather is "Currently it's 88 degrees and sunny" an adaptive content targeting model (described herein) may instead determine different content for the proactive voice notification, based on the current weather contextual information. In such an example, the personal assistant may instead output, "Currently it's 88 degrees and sunny . . . by the way, it looks like you might be running low on sunscreen. If you would like to order some, say 'Reorder sunscreen.'" In this example, although both bathroom tissue and sunscreen may be on the user's order list, the adaptive content targeting model may use the weather information to target the sunscreen over the bathroom tissue, based on the context.

In some examples, the user may interact with content suggested by the proactive voice notification (e.g., playing a news article, ordering an item, etc.). In various examples, the user may not act on a proactive voice notification for some time. For example, a user may request that a voice notification related to reordering of an item may be output on a Monday, but the user may not provide instructions to reorder the item until Tuesday. For example, when there is a pending proactive voice notification (and/or other notification) a natural language processing-enabled device (e.g., a device on which a virtual assistant is enabled such as a smart speaker, a mobile phone, a smart device including a display, one or more microphones, and at least one speaker, etc.) may display an indicator light and/or may output an indicator sound (e.g., a chime) indicating that a notification is available for output. Upon a user request to play the notification, the notification may be output using the relevant channel. For example, a voice notification may be output as audio using one or more speakers of the natural language processing-enabled device (or which are in communication with the natural language processing-enabled device). In another example, a text-based and/or video notification may be played back on a display of the natural language processing-enabled device upon receiving a user request to play the notification. The user may provide instructions to play the notification in various manners. For example, the user may speak a wakeword followed by a request to playback the notification (e.g., "Alexa, what are my notifications?"). In another example, the user may interact with a graphical user interface in order to cause the notifications to be played back. When a notification has been received by a device (e.g., as indicated using an indicator light and/or a sound), but has not yet been played for the user, the notification is referred to herein as "not consumed" or "unconsumed." Conversely, after a notification (e.g., a proactive voice notification) has been played back for a user, the notification is referred to herein as being "consumed."

Proactive voice notifications may be sent in a variety of contexts to alert the user of any desired information. Additionally, in the speech processing and virtual assistant context, providing a positive user experience is often of paramount importance, as users tend to avoid interfaces that cause frustration or annoyance. For this reason, it is important to carefully consider the types of proactive voice notifications and content, the timing of such notifications, the frequency of such notifications, and the most appropriate device to which to send such notifications to provide a positive user experience and to minimize user friction. Described herein are various computer-implemented and machine learning techniques that may be used to adaptively determine whether a proactive voice notification should be sent and, if so, when it should be sent. Additionally, techniques are described to determine the frequency with which to send proactive voice notifications and for selection of the device to which to send the notifications. In some examples described herein, various input features may be used to make the aforementioned decisions regarding proactive voice notifications. For example, the features may relate to the subject content of the notification (e.g., an item or other content to which the voice notification pertains). In other examples, the features may relate to the particular user and their past interactions with previously-sent voice notifications (e.g., historical data related to past voice notifications). In some further examples, the features may relate to a perceived change in user behavior when voice notifications are sent and/or consumed, as opposed to when the voice notifications are not sent and/or remain unconsumed.

Although, as previously mentioned, proactive voice notifications may be sent in a variety of contexts, in many examples discussed herein, an example proactive voice notification in the context of an item reorder is used for illustrative purposes. For example, such a proactive voice notification may alert the user of one or more items that the user may potentially wish to reorder (e.g., based on past order history). However, the various systems and techniques may be applied to any desired voice notifications and are not limited to the item reorder context.

"Reorder" refers to a user reordering an item that the user has previously ordered. A user may reorder an item through a graphical user interface (e.g., on a website) and/or using a voice interface of a natural language processing application. One way in which natural language processing systems may facilitate reordering and helping users is by proactively engaging them with repeat purchase suggestions (e.g., reorder suggestions) through various channels.

In various examples described herein, a prediction score representing a prediction that a user may want to reorder an item (based on past order history) may be generated by a machine learning model referred to herein as a Remember-To-Reorder (RTR) model. For example, the RTR model may predict the probability of a user to reorder each of the products in the user's order history within a predefined time period (e.g., within the next seven days). RTR is trained on users' order history, and is oblivious to suggestions (e.g., voice notifications) that are surfaced by natural language processing systems and the effect or outcome of such suggestions. Described herein is an machine learning model that better accounts for the incremental value that proactive voice notifications bring to users (in terms of the change in the probability to act on the notification). In various examples, the machine learning model (e.g., adaptive content targeting model 160 of FIG. 1) may update the purchase probability predicted by RTR under the assumption that the proactive voice notification will be consumed. In addition, a machine learning model is described that is able to schedule proactive voice notifications (e.g., at a time that they are most likely to be consumed by the user). In some other examples, a notification frequency model is described that determines an appropriate frequency with which to send proactive voice notifications (e.g., in a manner that is least likely to cause user annoyance and/or in a manner that satisfies one or more other constraints). In some other examples, a device selection model is described that selects a particular device (from among multiple user devices) for outputting a proactive voice notification. Although the foregoing models may be described as separate models, in some cases, the various models may be implemented in a single machine learning model architecture (e.g., trained end-to-end). As previously described, beyond reorder predictions, other predictive models may predict whether a user would want to receive notifications related to content. For example, a prediction as to whether a user would like to hear a breaking news story and/or hear a song may be generated. Accordingly, an adaptive content targeting model 160 may update the prediction that the user will output the content assuming that the user consumes a proactive voice notification related to the content.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. As described in further detail below, in some examples, NLU processing may include multiple different processes that may be executed for a given natural language input in order to determine a semantic interpretation of the natural language input. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable instructions) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills, speechlets, and/or other types of speech processing software.

In various examples, natural language processing systems may determine an action to take for processing particular request data according to an interpretation of the natural language input (represented by the request data), as determined by NLU. Dialog sessions may be carried out between a user and a natural language processing system. A dialog session may include multiple turns of dialog between the user and TTS synthesized speech output by the natural language processing system. In a simple example, a user request (e.g., "Computer, order light bulbs") followed by a natural language response (e.g., "OK, would you like for me to reorder Brand X light bulbs, previously purchased on [date]?") constitutes a dialog session with two turns. Dialog sessions may include any number of turns. For example, in the previous example of reordering light bulbs, the user may respond by saying "No, order Brand X light bulbs 2700K." The dialog session may continue with the natural language processing system outputting the synthesized speech "OK, ordering Brand X light bulbs 2700K with a price of [price] for [quantity] light bulbs." In this example, the dialog session may have four turns (e.g., two user turns and two voice assistant turns).

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc. Other examples of smart home devices and/or systems that may use adaptive targeting for proactive voice notification systems described herein may include Google Nest Smarthome products from Google LLC, HomeKit devices from Apple Inc., etc. In addition, the various adaptive targeting for proactive voice notification techniques described herein may be implemented on a natural language processing enabled device and/or on another device that is communicating on a network with one or more other network-connected devices (e.g., IoT devices). For example, the various adaptive targeting for proactive voice notification techniques described herein may be executed on a smart home "hub" device configured to control various other IoT devices on premises. In some other examples, the various adaptive targeting for proactive voice notification techniques described herein may be executed on a mobile device (e.g., on a user's phone, laptop, etc.) or a desktop device.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., order history, device names, and/or any personal data) may be controlled by a user using privacy controls associated with a speech processing enabled device and/or a companion application associated with a speech processing enabled device. Users may opt out of storage of personal, order history, device names, and/or contextual data and/or may select particular types of personal, device name, device state, order history, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

Natural language processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.). In various examples, skills may execute one or more of the machine learning models described herein for adaptive targeting for proactive voice notification systems.

In various examples, a natural language processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

FIG. 1 is a block diagram illustrating an example environment for adaptive targeting for proactive voice notifications, according to various embodiments of the present disclosure. The system 100 may include, for example, a first voice-enabled device 102 and a second voice-enabled device 105. The first voice-enabled device 102 and/or the second voice-enabled device 105 may be configured to receive user utterances and perform operations in response to such user utterances. In addition, the first voice-enabled device 102 and the second voice-enabled device 105 may be effective to output voice notifications. In some cases, the first voice-enabled device 102 and/or the second voice-enabled device 105 may display an indicator light and/or may output a notification sound when a voice notification is waiting to be consumed (e.g., played back for the user). In various examples, the first voice-enabled device 102 and/or the second voice-enabled device 105 may output the voice notification based on a user command (spoken or non-spoken) to play back notifications. In various other examples, the voice notification may be output directly (without receiving a user request), may be output based on user presence information, may be output in response to some other user interaction with a virtual assistant, etc. In any case, when the voice notification is output, the voice notification may be considered consumed.

In some examples, the first voice-enabled device 102 and/or the second voice-enabled device 105 may be "hands free" such that interactions with the devices are performed through audible requests and responses. The first voice-enabled device 102 may be located or otherwise situated in a first space. The second voice-enabled device 105 may be located or otherwise situated in a second space. As shown by way of example in FIG. 1, the first voice-enabled device 102 is located in an "office" while the second voice-enabled device 105 is located in a "bedroom." It should be understood that the devices may be located in spaces other than those specifically mentioned in this disclosure. It should also be understood that while the spaces depicted in FIG. 1 are rooms, the spaces may be any space.

The system 100 may also include a personal device 108, which may include a mobile device such as a mobile phone. The personal device 108 may be associated with the voice-enabled devices 102, 105. In these examples, the personal device 108 may be configured to send data to and/or receive data from the voice-enabled devices 102, 105. In various examples, the personal device 108 may also be effective to receive and output proactive voice notifications in accordance with the various techniques described herein.

The first voice-enabled device 102, the second voice-enabled device 105, and/or the personal device 108 may be configured to send data to and/or receive data from a remote system 110, such as via a network 104. In examples, one or more of the component of the remote system 110 may communicate directly with the remote system 110, via the network 104. Additionally, the personal device 108 may communicate directly with the voice-enabled devices 102, 105, and/or the remote system 110.

The first voice-enabled device 102 and/or the second voice-enabled device 105 may include one or more components, such as, for example, one or more processors 114, one or more network interfaces 116, memory 118, one or more microphones 470, one or more speakers 122, one or more displays 124, and/or one or more cameras 126. The microphones 470 may be configured to capture audio, such as user utterances, and generate corresponding audio data. The speakers 122 may be configured to output audio, such as audio corresponding to audio data received from another device (e.g., from a content streaming service) and/or the remote system 110. The displays 124 may be configured to present images, such as images corresponding to image data received from another device and/or the remote system 110. The cameras 126 may be configured to capture images and to generate corresponding image data. In various examples, the first voice-enabled device 102 and/or the second voice-enabled device 105 may output proactive voice notifications using speaker(s) 122. In addition, in some examples, the first voice-enabled device 102 and/or the second voice-enabled device 105 may display an indicator light and/or may output a notification sound when unconsumed voice notifications (or other notifications) are ready for user review.

The personal device 108 may include one or more components such as, for example, one or more processors 136, one or more network interfaces 138, and memory 140. The memory 140 may include one or more components, such as, for example, one or more applications 142. The applications 142 may reside on the memory 140 of the personal device 108 and/or the applications 142 may reside elsewhere, such as with the remote system 110, and may be accessible via the personal device 108. The applications 142 may be configured to cause the processors 136 to display one or more user interfaces associated with operations of the voice-enabled devices 102, 105. The user interfaces may be utilized to receive inputs from the user of the personal device 108 and/or to provide content to the user. In various examples, speakers of the personal device 108 may be used to output proactive voice notifications in accordance with the various techniques described herein.

The remote system 110 may include components such as, for example, a user registry 150, one or more data stores 152, a natural language processing system 220, adaptive content targeting model 160, notification scheduler model 162, notification frequency model 164, and/or device selection model 166. The natural language processing system 220 may include an automatic speech recognition (ASR) component 250, a natural language understanding (NLU) component 260 (including a named entity recognition component), and/or a text-to-speech (TTS) component 280. In some examples, the natural language processing system 220 may include an orchestrator service effective to implement the various models 160, 162, 164, 166. However, in other examples, the models 160, 162, 164, 166 may be implemented by other computing devices that are configured in communication with the natural language processing system 220. For example, the models 160, 162, 164, and/or 166 may be implemented by an edge device (e.g., a device that is local to user). Further, although described herein as separate models, the models 160, 162, 164, and/or 166 may be implemented as a single machine learning architecture. In some further examples, a subset of the models 160, 162, 164, and/or 166 may be combined into a single model. For example, the adaptive content targeting model 160 and the notification scheduler model 162 may be implemented as a single machine learning architecture, while the notification frequency model 164 and/or the device selection model 166 may be separately implemented.

Each of the components described herein with respect to the remote system 110 may be associated with their own systems, which collectively may be referred to herein as the remote system 110, and/or some or all of the components may be associated with a single system. In examples, some or each of the components of the remote system 110 may include their own processor(s), network interface(s), and/or memory. As such, by way of example, the natural language processing system 220 may include and/or be associated with processor(s), network interface(s), and/or memory. Additionally, the operations and/or functionalities associated with and/or described with respect to the components of the remote system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 150 may be configured to store information associated with user accounts. For example, the user registry component 150 may store past order history of users, past dialog sessions between the user and the natural language processing system 220, indications of past notifications sent to the user and whether such notifications were or were not consumed, etc. Data associated with the user accounts may include, for example, account access information, historical usage data, device-association data, and/or preference data.

The data stores 152 may be configured to identify, determine, and/or generate data associated with use of the voice-enabled devices 102, 105 and/or the personal device 108. Usage data may be identified, determined, and/or generated that indicates some or each of these interactions. In various examples, data representing whether or not proactive voice notifications were consumed and/or were acted on (e.g., by reordering an item mentioned in a consumed voice notification) may be stored in data stores 152. In various examples, data stores 152 may be used to store the various features used by models 160, 162, 164, and/or 166 for prediction.

In the example shown in FIG. 1, speakers of voice-enabled device 102 are outputting the proactive voice notification "Would you like to reorder batteries?" In the example, the adaptive content targeting model 160 may have determined that the proactive voice notification (concerning reordering of batteries) was appropriate to output, as described in further detail below. Additionally, the notification scheduler model 162 may have determined the appropriate time to output the voice notification. Further, the notification frequency model 164 may determine a frequency with which to send the voice notification, and the device selection model 166 may have selected voice-enabled device 102 for outputting the voice notification from among other devices (e.g., personal device 108 and/or voice-enabled device 105).

As used herein, a processor, such as processor(s) 114 and/or 136, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 136, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 136, and/or the processor(s) described with respect to the components of the remote system 110 may possess its own local memory, which also may store program components, program data, and/or one or more operating systems.

The memory 118, 140, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 140, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 140, and/or the memory described with respect to the components of the remote system 110 may be implemented as computer-readable storage media ("CRSM"), which may be any available physical media accessible by the processor(s) 114, 128, 136, and/or the processor(s) described with respect to the components of the remote system 110 to execute instructions stored on the memory 118, 140, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The network interface(s) 116, 138, and/or the network interface(s) described with respect to the components of the remote system 110 may enable messages between the components and/or devices shown in remote system 110 and/or with one or more other remote systems, as well as other networked devices. Such network interface(s) 116, 138, and/or the network interface(s) described with respect to the components of the remote system 110 may include one or more network interface controllers (NICs) or other types of transceiver devices to send and receive messages over the network 104.

For instance, each of the network interface(s) 116, 138, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 138, and/or the network interface(s) described with respect to the components of the remote system 110 may include a wide area network (WAN) component to enable message over a wide area network.

Additional detail regarding the adaptive content targeting model 160 is shown below. In various examples, the adaptive content targeting model 160 scales predictions output by the RTR model (not shown in FIG. 1). As previously described the RTR model predicts the probability of a user to reorder a product from their order history during a predefined period of time (e.g., the next 5 days, 7 days, 20 days, etc.). RTR uses the users' purchase history and extracts a wide range of features, including various personal and aggregate order patterns and consumption rates. The model exhibits a tradeoff between its precision (the relevance of reorder suggestions as measured by their purchase rate) and the user coverage (or recall). For example, the RTR model can be adjusted to have suggestions for more users, but those suggestions will aggregatively have lower reorder probability. In an example, RTR may be tuned to meet a target Attributed Purchase Rate (APR) (e.g., 10%, 20%, etc.) for a given predefined time period. More generally, the adaptive content targeting model 160 may scale predictions related to any content based on a prediction that a proactive voice notification will increase the likelihood that a user will interact with the content.

The purpose of the adaptive content targeting model 160 is to optimize the RTR predictions (or other content predictions) for the delivery channel (e.g., for the voice notification channel) and to protect the user experience. RTR is channel-agnostic, it simply predicts the probability that a user is going to reorder a given product during the next X days. The adaptive content targeting model 160, the notification scheduler model 162, the notification frequency model 164, and/or the device selection model 166 are mechanisms to tailor the content, frequency, timing, and/or destination of proactive voice notification for each user in order to maximize user engagement, prevent user fatigue, and build trust concerning interaction with a virtual assistant enabled on the voice-enabled devices 102, 105 (and/or on personal device 108). The adaptive content targeting model 160 is able to predict whether a user may be attentive and/or responsive to a proactive voice notification.

The adaptive content targeting model 160 model may be used for proactive voice notifications (e.g., voice-based reorder notifications and/or other notifications related to content). The adaptive content targeting model 160 adjusts the initial purchase probability (output by RTR) and/or content interaction probability to predict the probability for content interaction (e.g., a purchase) given that the user consumed the voice notification. Various features are used which reflect the relations between historical RTR predictions (or other predictions) and the outcomes of consumed notifications, as well as signals about additional user responses (e.g., a user showed positive intent/feedback toward a prediction although the user did not act on it). Two approaches for the adaptive content targeting model 160 are described: the first is a prediction model that takes RTR's prediction as a feature, while the second is a model that aims to predict the additive change in probability with respect to RTR's prediction.

There are several metrics that may be used to evaluate the performance of the adaptive content targeting model 160. Attributed purchase rate (APR) is one metric which measures the fraction of proactive voice notifications that result in a reorder (e.g., purchase) within some attribution window following the voice notification having been consumed. Two common attribution windows are 1 day and 7 days. Another metric may be an add to cart (ATC) rate. This metric measures the fraction of voice notifications consumed by customers that result in ATC actions using a natural language voice command (or otherwise). Other (positive) effects, such as acting on the content in the voice notification later through the Web or through a natural language command (but without a direct ATC), exists but are secondary in magnitude. Also, opposite (negative) effects, like giving up on planned reorder due to frustration from a voice notification, may be used as features. In a non-reorder context, APR may be replaced by a metric that indicates the fraction of proactive voice notifications that result in the user interacting with the content that is the subject of the proactive voice notification (e.g., when the user plays the recommended movie, news item, etc.).

Other useful metrics relate to the rate of events that hint about the friction users are experiencing with interaction with the natural language processing system. For example, sentiment and general intent may be extracted from user response to notifications. User utterances may be classified following a proactive voice notification into those that show strong negative intents (SNI, e.g., a user requests to opt-out from getting voice notifications), weak negative intents (WNI, e.g., a user interrupts the virtual assistant while voice notification is being consumed), and positive intents (PI, e.g., a user thanks the virtual assistant for the notification). In some examples, the natural language processing system may also elicit explicit binary feedback from the user by asking whether the experience was helpful (WTH).

Example Features for Adaptive Content Targeting Model 160

It may be assumed that the outcome of a proactive voice notification depends on the relevance of the suggestion, represented by RTR's prediction (or other predictions related to content) for the user-item pair $s_{c,a}$, (e.g., a pair between the customer ID and an item number) and additional factors like user's perception of voice notifications in general and their perceived helpfulness for specific products offered through a voice shopping interface provided by the natural language processing system 220. In the most general modeling, the adjustment of the prediction probability depends on the user, the particular content, and their intersection. Due to the sparsity of the voice notifications data, features are described independently on the user level and the content level in the current example, as opposed to being described on their intersection level. However, in other implementations intersection features between the user and content may be used. The example features in the table below reflect the influence on the user (regardless of the specific item), and the helpfulness in presenting the content as a voice notification (regardless of the user). Table 1 summarizes the user-level features. The content-level features are an analogous subset of the user-level features, but are aggregated at the content level. For example, consumed rate on an item level is meaningless, and is thus omitted.

TABLE 1

| Feature | Description |
| --- | --- |
| $f_1^c$ | number of notifications sent to the users |
| $f_2^c$ | number of notifications consumed by the user |
| $f_3^c = f_2^c/f_1^c$ | consumed rate, i.e., % of notifications consumed by the user |
| $f_4^c$ | average RTR score of notifications consumed by the user |
| $f_5^c$ | APR of notifications consumed by the user |
| $f_6^c$ | APR of notifications not consumed by the user |
| $f_7^c = f_5^c - f_6^c$ | consuming APR lift |
| $f_8^c = f_5^c - f_4^c$ | relevance to consumed APR additive lift |
| $f_9^c = f_5^c/f_4^c$ | relevance to consumed APR multiplicative lift |
| $f_{10}^c$ | SNI rate in user's response to interactive notifications |
| $f_{11}^c$ | SNI in user's response to last interactive notification |
| $f_{12}^c$ | WNI rate in user's response to interactive notifications |
| $f_{14}^c$ | PI rate in user's response to interactive notifications |
| $f_{15}^c$ | % positive responses by the user to WTH survey |
| $f_{16}^c$ | on-Alexa interactive ATC rate of notifications consumed by the users |
| $f_{17}^c$ | on-Alexa interactive ATC & AP rate of notifications consumed by the users |

Adaptive Content Targeting Model 160 Training

In an example, a Gradient Boosting Decision Trees (GBDT) model may be trained using voice notifications data. However, other approaches of supervised classification given a set of features may also be used (e.g., support vector machines (SVMs), decision trees, random forest, neural networks, logistic regression, etc.). Further, in some examples, a deep learning approach such as a convolutional neural network (CNN) and/or a transformer-based algorithm may be used. The training goal may be to predict the APR of a voice notification, given that it is consumed by the user. Accordingly, in an example, only data of consumed notifications are used. The adaptive content targeting model 160 may scale the RTR prediction score. The scaled score may be used for ranking potential voice notifications and/or may be compared to a threshold to determine whether or not to send a reorder notification for a given item.

Range of RTR Scores of Voice Notifications Used for Training

A classification model may be trained with [$s_{c,a}$, user features, item features] as features for each potential voice notification. In order to allow a performance gain at the same point of production coverage, the RTR threshold for the voice notification may be lowered, yielding a greater potential of voice notifications with lower $s_{c,a}$. The best predictions are prioritized by the new model (new threshold choice for the new adaptive content targeting model 160's prediction score).

In an additive approach, using an additive function to $s_{c,a}$, the increment (e.g., the delta from $s_{c,a}$) may be predicted. In one example, a regression model may be trained with label of AP (binary conversion label)$-s_{c,a}$. In the inference stage, the adaptive content targeting model 160 is applied on interaction features [user features, item features] without $s_{c,a}$, and the output of the model, $\Delta_{c,a}^{ACT}$ is added to $s_{c,a}$ to get the final estimation of $APR^r$ (online conversion).

$$s_{c,a}^{ACT} = s_{c,a} + \Delta_{c,a}^{ACT} \qquad (1)$$

The additive version of the model can be trained on "higher score" training data as described above. While such approach limits the possible modeling of offline-to-online transfer function (to an additive form), it supports monotonicity in RTR score by definition, and is less tangled to scores observed in training data (as it doesn't use them as a feature), thus it may be hoped to have a better generalization when training on high RTR-score predictions and applying on lower.

As previously described, after a user has been sent a voice notification an indicator may be displayed by the recipient voice-enabled device. When the user asks to hear the notification, the virtual assistant may present an offer: "One new notification from the Online Shopping System, based on your order history, you may be running low on [summarized product name]. It's [price]. With delivery by [date]. Would you like to add it to your cart?" The user may thereafter act on the offer using spoken commands.

While there are types of time-critical notifications that must be sent upon its generation (e.g., notifying a user on expected delivery arrival within few hours), most current notifications types remain relevant within a time-window (e.g., a day or a week). In particular, reorder voice notifications may be updated on a daily basis and may remain valid for the duration of the day. Users' attentiveness to voice notifications vary across hours of the day and days of the week. The proactive reorder notifications lead to higher-consequence actions (e.g., purchase) than other proactive experiences, and thus, require higher attention from users. It may be assumed that when a user receives a voice notification at a time during which the user is not receptive to voice notifications that the user is less likely to act on the voice notification both short-term and long-term.

Accordingly, the notification scheduler model 162 may predict a time slot during which to send a voice notification. The notification scheduler model 162 may predict a user's contextual attentiveness based on the user's behavior in the past. In some examples, time-contextual attentiveness may be approximated using past notification data such as the consumed-rate of past voice notifications and time-to-consume data for notifications that were consumed. Increase in consumed-rate indicates that more users were found in a relevant frame of mind to ask to hear their voice notifications. Average time-to-consume metric, directly reflects the timeliness of voice notifications.

Described herein is a notification scheduler model 162—a machine-learning-model-based scheduler that adaptively adjusts the time in which proactive voice notifications are sent to users. In an example implementation, the notification scheduler model 162 may be based on a Gradient Boosting Decision Trees approach (although a deep learning approach may be used) and predicts the probability of a user to consume a notification at a given time of the week, taking into consideration past activity patterns of the user. Those user activities include, for example, event times of voice notifications creates and outputs (e.g., consumptions), purchasing event times on e-commerce sites, and times (e.g., times-of-day) when the user interacts with a natural language processing system (e.g., based on a number of utterances representing the user interacting with the natural language processing system from the user during various time slots). In examples described herein, the notification scheduler model 162 is optimized with respect to a single objective of consume-rate, and further heuristics are applied to consider trade-offs with actionable reorder metrics (such as add-to-cart-rate). However, in other examples, the notification scheduler model 162 may be optimized for multiple objectives (such as APR, ATC, etc.).

In an example implementation, the notification scheduler model 162 may predict the probability of a user to consume a voice notification sent at a given timeslots during the week. However, as previously noted, the notification scheduler model 162 may be trained for multiple objectives. Examples include predicting timeslots that minimize user frustration, increase the chances of the user acting on the voice notification, correlate with times during which the user tends to interact with the natural language processing system, etc.

In one example, the notification scheduler model 162 may be implemented using a Gradient Boosting Decision Trees (GBDT) approach for binary classification. However, other machine learning algorithms may also be used (e.g., CNNs, transformer-based approaches, etc.). The notification scheduler model 162's hyperparameters may be optimized over a large search space using hyperopt package and the top-performing configuration may be selected with respect to a max-F1-score on a validation set. The model is trained over activity data A until time t. For training, users are considered that were sent at least one notification during the week that follows t. For each user $C_j$ with a sent notification during the week that follows t with create time ($dow_j$, $hour_j$), 4 types of features may be collected: (i) global user behavior features, independent of the notification create time within the week, (ii) local user-time features that capture temporal behavior of the user with respect to the notification create time within the week, (iii) user-contextual features, and (iv) time-contextual features of the notification create time within the week, independent of the user. During training, the supervision signal associated with the feature vector of each pair ($C_j$, ($dow_j$, $hour_j$)) is equal to 1 if user $C_j$ consume the notification that was sent on ($dow_j$, $hour_j$) following t, and 0 otherwise.

A given week is partitioned to disjoint time-slots (not necessarily continuous) and behavioral features of users are computed with respect to the time-slot partitions. Let a time-slot $T_j$ denote a set of day-of-week and hour-of-day pairs, and consider a partition of a week into disjoint time-slots $T=\{T_j\}_{j=1}^{T}$. In an example of disjoint partitioning, a week may be partitioned into time-slots with different granularity, including partition to 84 time-slots of consecutive 2 hours $\{\{(d, 2h), (d, 2h+1)\}|0 \le d \le 6, 0 \le h \le 11\}$, and 12 daily 2-hour time-slots $\{\{(\bullet, 2h), (\bullet, 2h+1)\}|0 \le h \le 11\}$.

Figure 9:
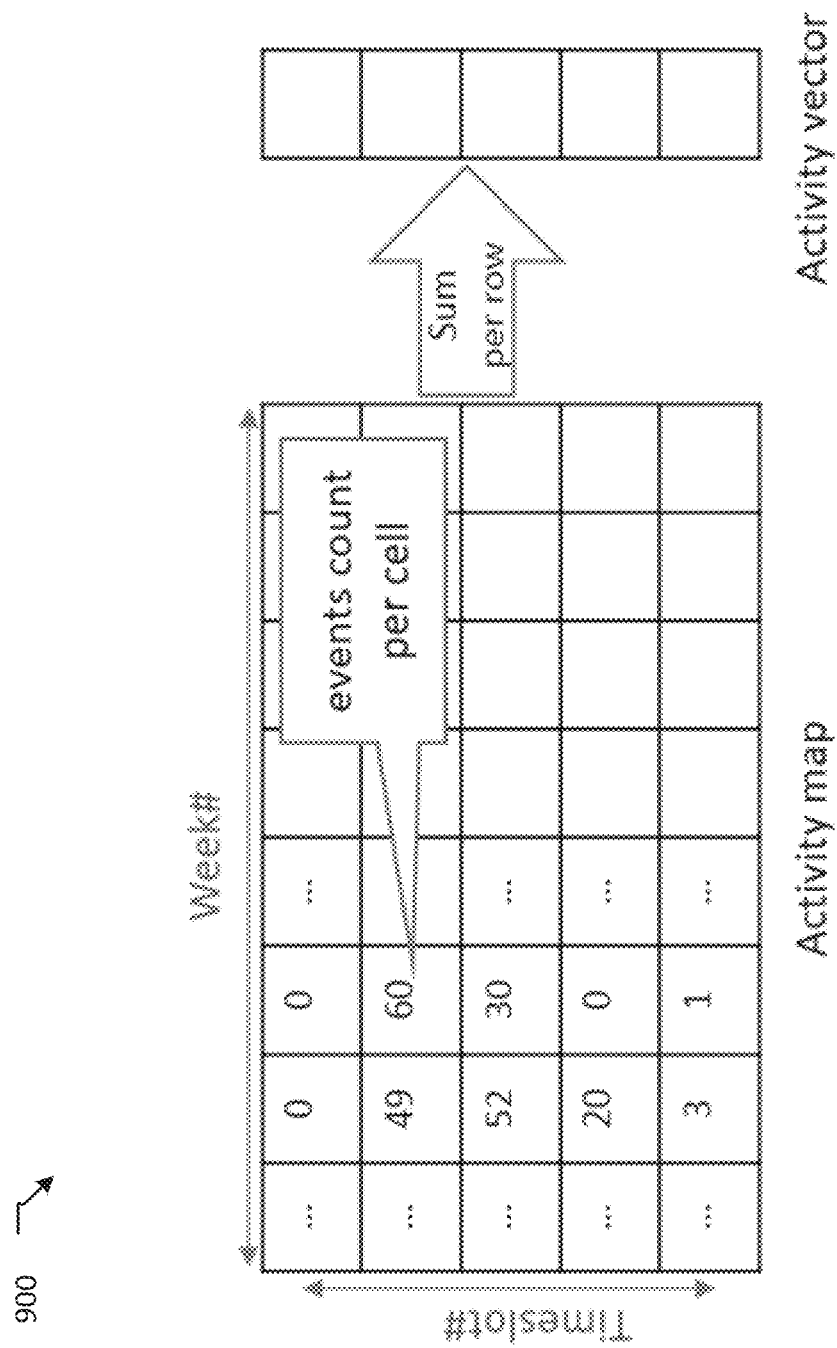
FIG. 9 is an activity map used by a notification scheduler model, in accordance with various aspects of the present disclosure.

Let E denote a set of timestamped events over W weeks and consider a T×W matrix $A^E$ such that $A_{t,w}^E$ equals the number of events in E that occurred in time-slot t of week w. $A^E$ may be the activity map of E (see activity map 900 in FIG. 9). Let the T dimensional vector $B^E=A^E \cdot 1$ denote the activity vector of E, accumulating number of events per time-slot over the W weeks. See, for example, the activity map 900 in FIG. 9.

Different types of activity event sets may be considered per user. For example, a natural language-based shopping service may generate timestamps of reorder notifications (e.g., voice-based reorder notifications) that the user consumed and timestamps of reorder notifications that the user did not consume (e.g., a time at which such notifications were sent to the user's device(s)). In addition, events may include timestamps generated by the natural language-based shopping service that indicate a time at which consumed notifications were consumed by the user. In further examples, another activity set events may include the user's utterance activity (e.g., timestamps of utterances spoken to natural language processing system 220 by the user). In another example, an activity set event may include timestamps of orders placed by the user using an e-commerce website. It should be noted that the foregoing events are merely examples and that other event types may be used depending on the objective(s). For example, events representing user frustration (e.g., timestamps representing the user interrupting voice notifications and/or expressive negative intents during voice notifications), events representing positive intents, etc., may be used in addition to, or in place of the various events mentioned above.

In some examples, timestamps may be considered in the time zone of the particular user in order to be aligned on hour of the day between users in different time zones. For each type of event set, two time ranges may be considered: (i) long-range events set that spans over 24 weeks (roughly 6 months) before the prediction week and intended to capture the mean steady-state behavior of the user, and (ii) short-range events set that spans over 4 weeks before the prediction week and intended to capture recent user behavior characteristics.

In an example, the activity vector may be computed per (activity type, time range, time-slots partitioning) configuration tuple, resulting in 5·2·4=40 activity vectors per user. Behavioral features are derived from the activity vectors as follows.

Global user behavioral features. For each activity vector of a user, its sum (total number of events) may be computed, along with the mean value, standard deviation, minimum, maximum, and median values (excluding 0s). These values are dependent on the time-slots partition and granularity, however independent of the target notification create time.

Local user-time behavioral features. Each activity vector of a user provides an histogram of the user's event counts over the T time-slots partitioning of a week. In addition, 5 additional vectors derived from the activity vector may be computed: normalized histogram, rank, ratio-to-min-value, ratio-to-max-value, and ratio-to-median-value. These values capture the temporal behavior of the user in each time-slot of the week.

In order to focus the notification scheduler model 162 on the user's response in the target voice notification create time, values may be extracted from the processed activity vectors that correspond to the time-slot that contains the target voice notification create time, as well as neighboring time-slot indices (±1 mod T). The distance may be restricted to one neighboring time-slots in order to prevent over-fitting. Note that the personal localized time behavioral features in the proximity of the notification target create time are provided in the feature vector along with the global user behavioral features such as mean and standard deviation of events over time-slots. This may help the model to gain context of localized personal behavior with respect to the user's global personalized behavior over the week.

User-context features include contextual data of the user that is independent of the time-slot partitioning and notification times. For example: a user's timezone, most-used voice-enabled device type, number of owned voice-enabled devices, number of user identifiers within the user's household, etc. Time-context features include the target notification create time within the week and its corresponding time-slot identifiers in the considered timeslot partitionings. In addition to offline behaviors (e.g., past user behaviors) the notification scheduler model 162 may determine and/or otherwise receive real-time context signals as features to adjust scheduling to a user in real-time. Examples of such real-time context signals may include presence information such as sensing a user's presence near a device, ambient noise level information, context of a recent utterance sent to a virtual assistant, recent intents included in recent utterances (e.g., shopping, music, news, food, games), etc.

The example provided for a scheduler model based on a GBDT approach is dependent upon handcrafted engineered features provided to the models. However, other machine learning approaches/algorithms that seamlessly extract features directly from raw data with respect to the task objective upon training can be applied as well. For example, deep learning approaches (e.g., CNNs, transformer-based approaches, GNNs, etc.).

In a second example, the notification scheduler model 162 may be implemented using a deep CNN architecture for either binary classification or multi-class classification.

The model is trained over activity data A until time t. For training, users are considered that were sent at least one notification during the week that follows t. For each user $C_j$ with a sent notification during the week that follows t with create time ($dow_j$, $hour_j$), raw data of activity maps 900 $\{A^E\}_{E \in \varepsilon}$ is collected where $\varepsilon$ denotes the set of activity types (as described above). During training, the supervision signal associated with the input features data (activity maps of a user $C_j$) of each pair ($C_j$, ($dow_j$, $hour_j$)) is equal to 1 if user $C_j$ consumes the notification that was sent on ($dow_j$, $hour_j$) following t, and 0 otherwise. In a multi-classification task, the classes may correspond to valid time-slots of the week $V=\{V_j\}_{j=1}^{V} \subseteq T$, V<T, for sending notifications, and the supervision signal is equal to 1 for classes $V_i$ where user $C_j$ consumes a notification that was sent on ($dow_j$, $hour_j$)$\in V_i$ following t, and 0 otherwise. For example, having seven 2-hour valid time-slots per day for sending notifications between 8 AM-10 PM results in V=49 valid time-slots for sending notifications.

The loss function can be chosen for either single objective or multi-objective upon additional supervision labels (e.g., frustration expressed by the user upon consuming notification, positive action when consuming the notification, etc.).

Figure 10:
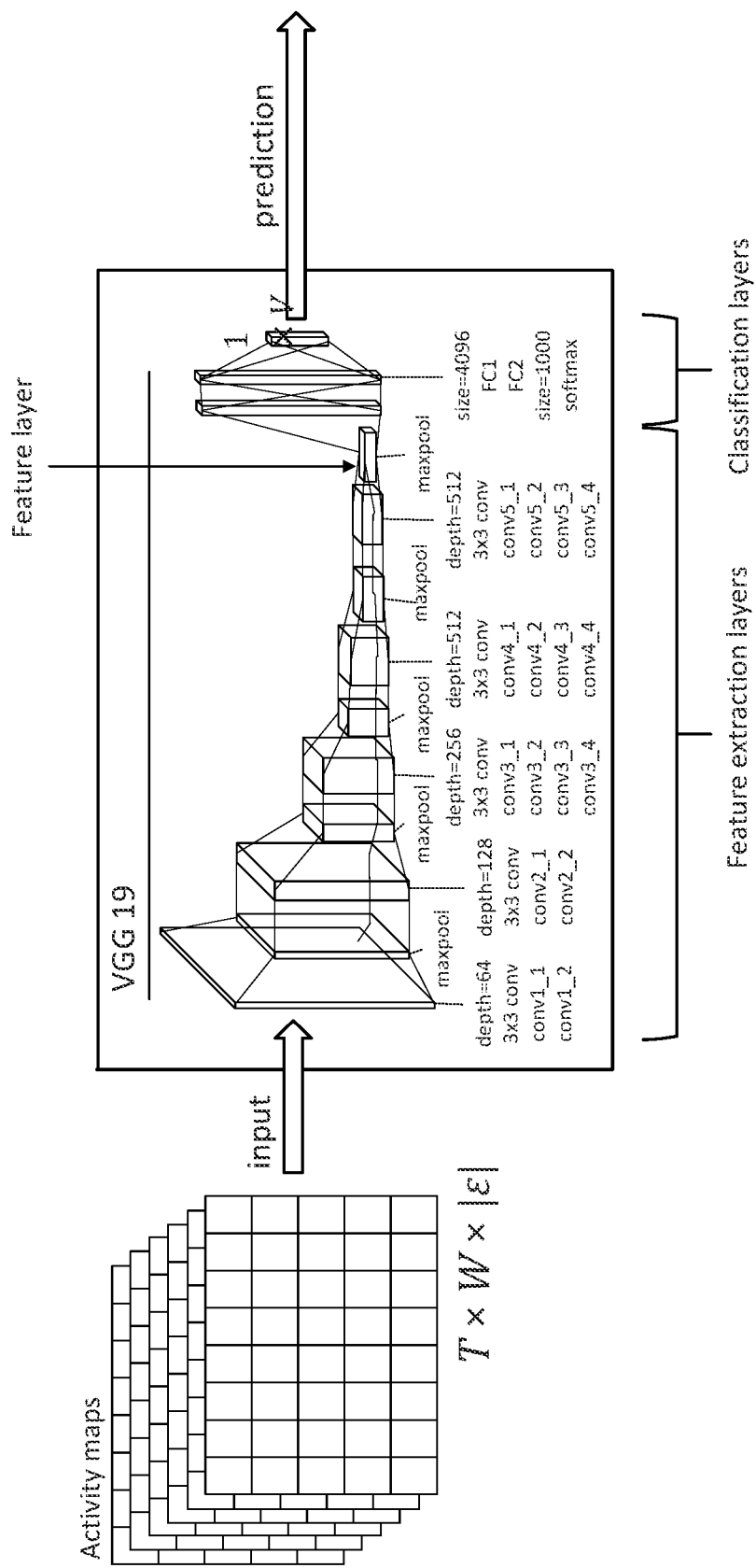
FIG. 10 is an example of a notification scheduler implementation using a deep learning approach, in accordance with some examples of the present disclosure.

FIG. 10 is an example of a notification scheduler model 162 implementation using a deep learning approach, in accordance with some examples of the present disclosure. The example depicted in FIG. 10 is based on a VGG19 CNN. However, any CNN architecture used for an image classification task may instead be used (e.g, VGGNet, ResNet, AlexNet, GoogLeNet/Inception, etc.). These architectures generally include feature extraction layers from a row input (i.e., image data in the case of computer vision), and classification layers for generating predictions. Without loss of generality, the example provided in FIG. 10 is based on a VGG19 architecture.

The standard 3 image channels (RGB) input may be replaced with |ε| activity maps (see FIG. 9) of size T×W for feature extraction. For example, using activity maps over W=48 weeks with 2-hour granularity time-slots partitioning (T=84) and 5 activity types results in matrix input size of 84×48×5 for the deep network (DN) architecture.

Size of the layers within the DN architecture may be adjusted for the activity maps dimension T×W. The last layer among the feature extraction layers is referred as the feature layer. The feature layer is then connected to subsequent flatten and dense fully connected (FC) layers for classification prediction. In the case of multi-class classification, the resulting last softmax layer is of size 1×V and holds a predicted probability distribution over the valid time-slots V. The value that corresponds to the $V_j$ class represents the predicted probability that the user is expected to consume a notification sent during time-slot $V_j$.

Figure 11:
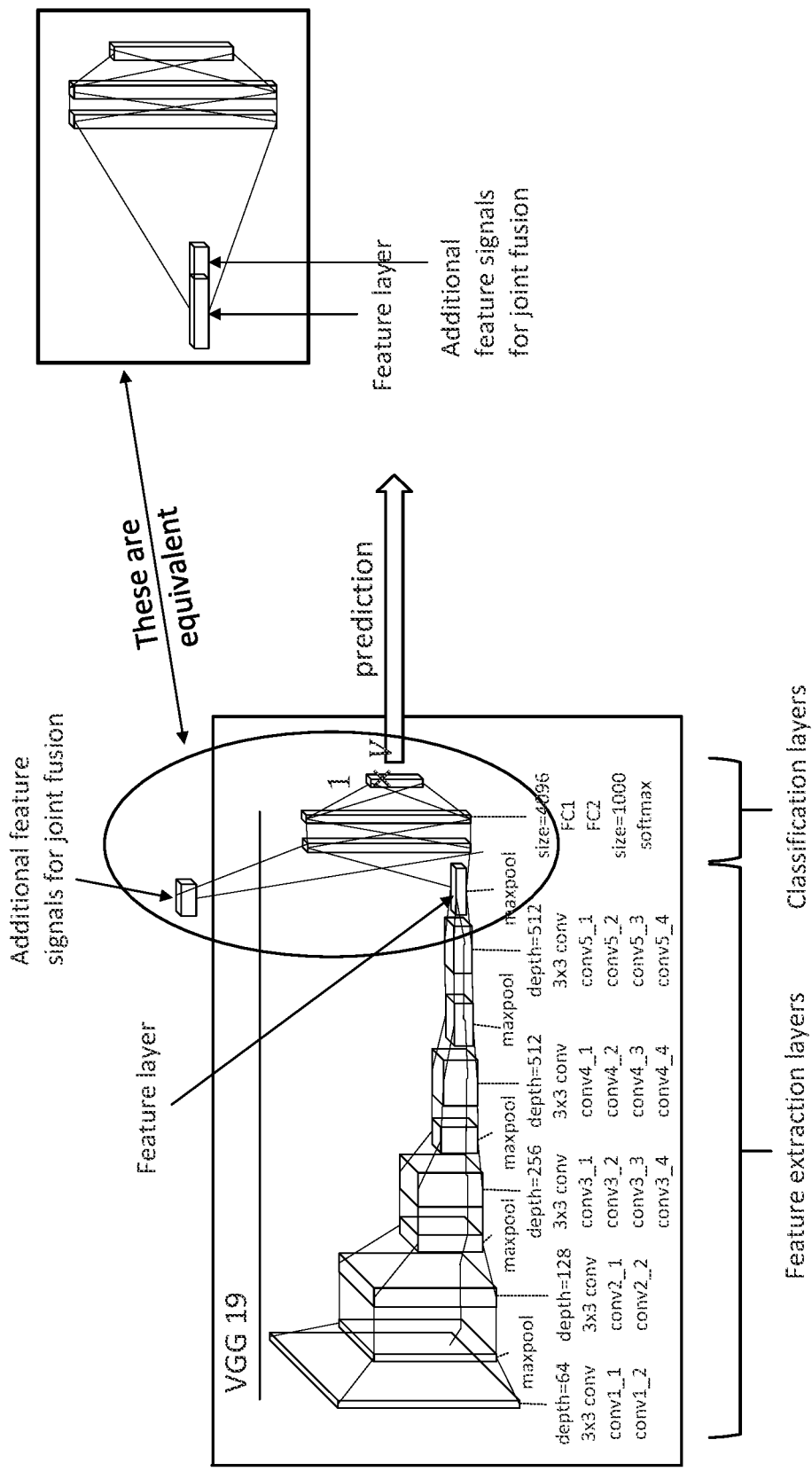
FIG. 11 depicts an example of fusion of feature signals for a deep learning based notification scheduler, in accordance with various examples of the present disclosure.

As shown in FIG. 11, additional feature signals, other than the raw activity maps data (e.g., user-context features, time context-features, real-time context signals (see above), etc.) can be added to the DN architecture using any fusion strategy (e.g., early, joint, late, etc.). For example, in joint fusion the additional features may be combined with the resulting feature layer by concatenation as input to the dense FC classification layers (see FIG. 11).

The notification scheduler model 162 may predict the timeslots during a given week that the user is most likely to consume a proactive voice notification. Notification frequency model 164 may be implemented using similar features to those described above with respect to the adaptive content targeting model 160 and the notification scheduler model 162. For example, a frequency at which to send proactive voice notifications (e.g., in the reorder context) may be predicted based on features indicating past notification consumption rates when voice notifications are sent at different frequencies (e.g., per-week frequencies). Similarly, device selection model 166 may select a device from among the various voice-enabled devices associated with the user (and/or the user's household). Features may include consume rates of past notifications associated with different device identifiers. In addition, data indicating user presence (e.g., presence data) may be used. Such data may include geofence data (e.g., global positioning data indicating that the user has entered a house and/or room), computer vision-based detection (e.g., facial recognition processing indicating that a user is present in a particular room and/or is located at a location proximate to a voice-enabled device), audio processing, and/or sensor data indicating a user's proximity to a particular voice-enabled device.

Although not shown in FIG. 1, another example machine learning model may be used to predict a channel and/or user experience with which to provide a proactive voice notification (or other notification). For example, a machine learning model may predict, for a given user and/or a given set of content, that the user may prefer a home screen image related to the content to be displayed. In another example, a wording of a proactive voice notification may be predicted based on the content and/or the user. Accordingly, the channel and/or user experience may be predicted to minimize user friction and to increase the likelihood that the user will ultimately consume and/or act on the notification.

Figure 2:
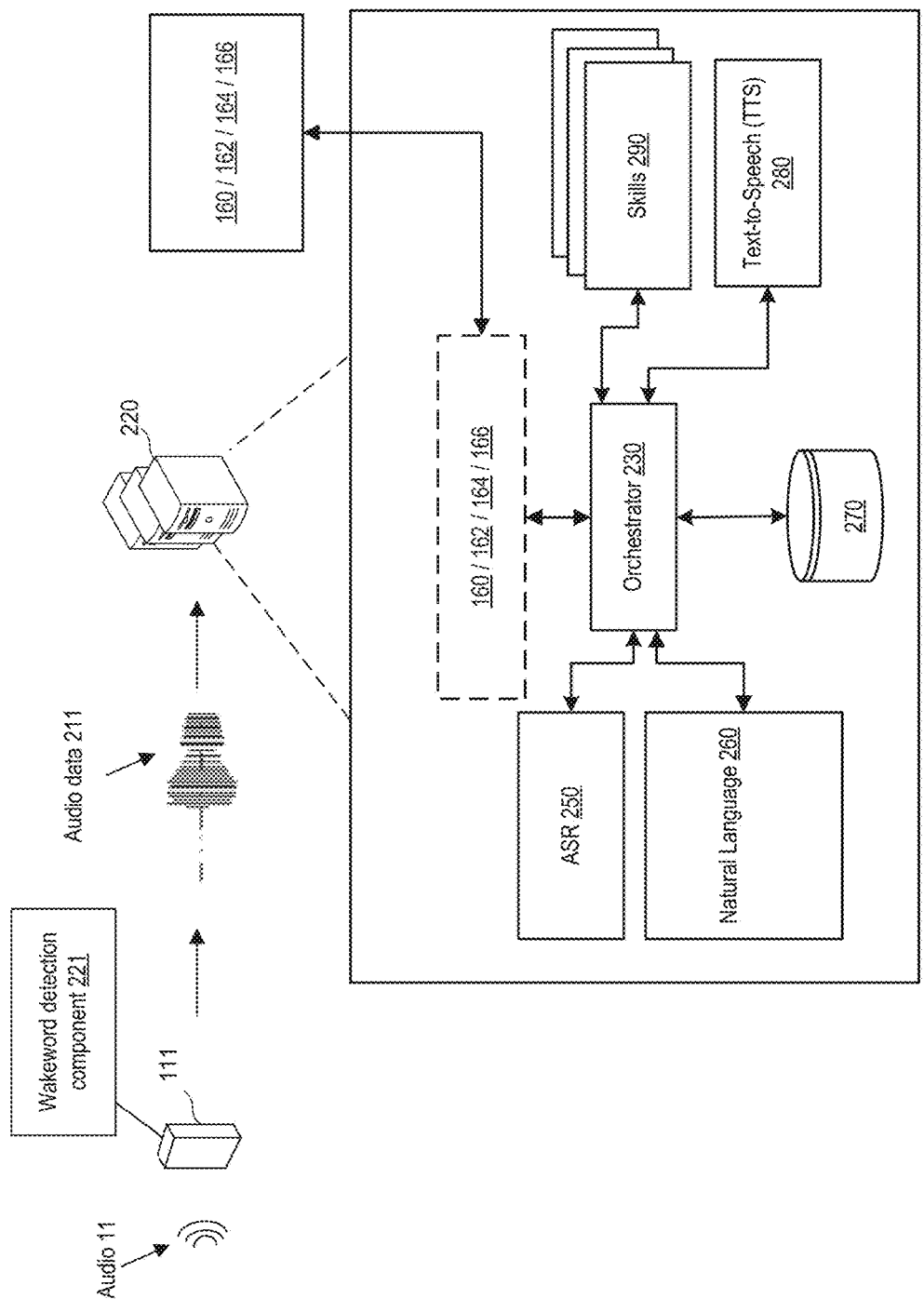
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "Play my unread notifications," the NLU component 260 may determine an intent that the system play unconsumed voice notifications.

The NLU component 260 outputs NLU results to the orchestrator component 230. The NLU results may include an NLU hypothesis, including a representation of an intent and corresponding slot data (e.g., "unread notifications" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc. An e-commerce shopping skill may generate voice notifications based on an RTR prediction score for a particular item in a user's order history (or, for example, a prediction score that a user will request output of particular content). Thereafter, adaptive content targeting model 160 may be used to scale the score to determine whether a proactive voice notification should be sent to a device associated with the user. Additionally, notification scheduler model 162 may be used to determine a time at which to send the voice notification. Notification frequency model 164 may determine a frequency at which to send voice notifications and device selection model 166 may determine to which device to send the voice notifications.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder. TTS component 280 may be used to generate audio data representing synthesized human speech. For example, the various voice notifications described herein (e.g., reorder voice notifications) may be transformed from text data into synthesized human speech using TTS component 280.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

In various examples, the adaptive content targeting model 160, notification scheduler model 162, notification frequency model 164, and/or device selection model 166 (e.g., "models 160, 162, 164, and 166") may be implemented as components of natural language processing system 220 and/or as separate components configured in communication with natural language processing system 220. For example, the models 160, 162, 164, and/or 166 may be implemented by different skills 290 (and/or by a single skill 290). For example, in the context of reorder voice notifications, the models 160, 162, 164, and/or 166 may be implemented by a shopping skill and may be used to determine whether to send a reorder voice notification for a given item (or items) in a user's order history. If a reorder voice notification is to be sent (e.g., as determined using the RTR model and the adaptive content targeting model 160), the time at which the reorder voice notification is to be sent may be determined (e.g., using notification scheduler model 162), the frequency at which to send the notification may be determined (e.g., using notification frequency model 164), and the device to which to send the notification may be determined (e.g., using device selection model 166).

Figure 3:
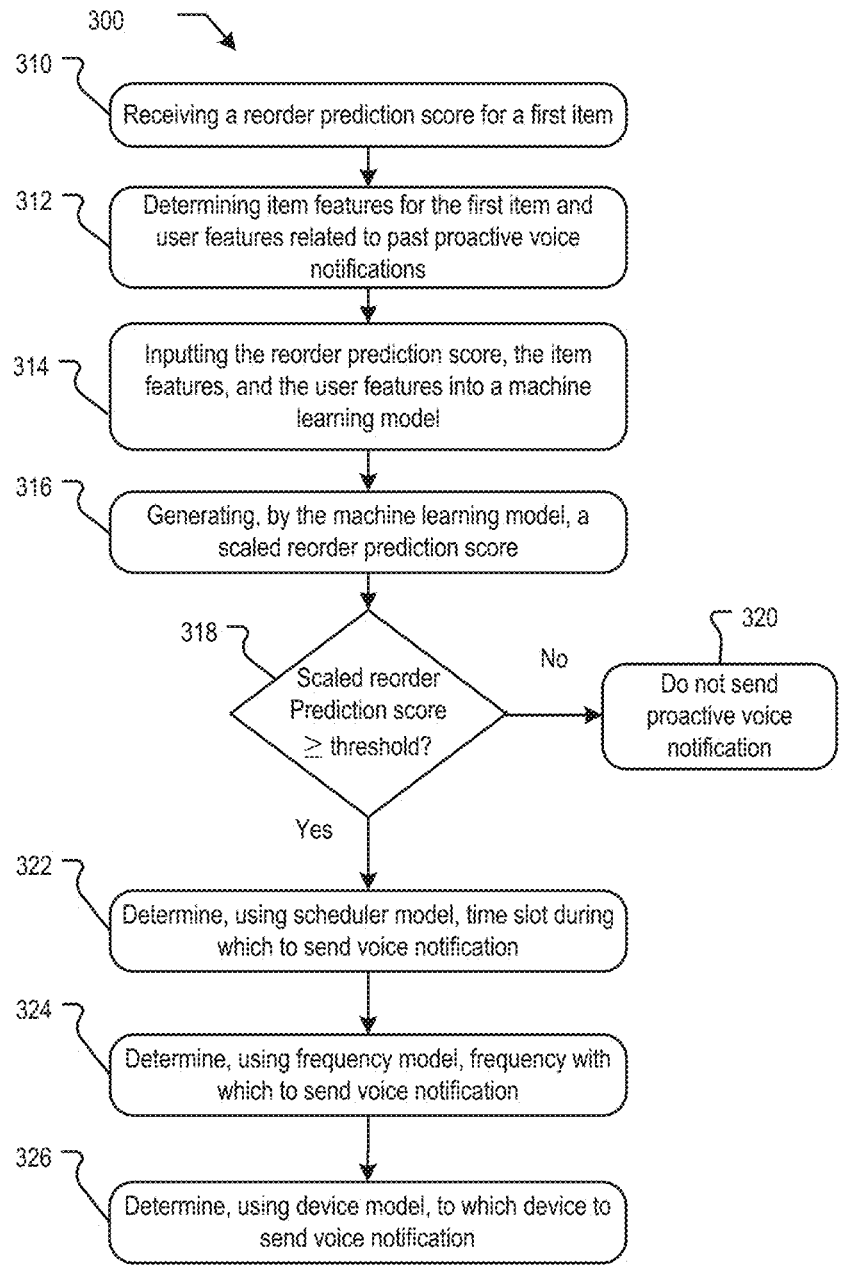
FIG. 3 depicts a flow diagram illustrating a process flow for adaptive targeting for proactive voice notifications, in accordance with various embodiments described herein.

FIG. 3 depicts a flow diagram illustrating a process flow for adaptive targeting for proactive voice notifications, in accordance with various embodiments described herein. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. The example in FIG. 3 may be specific to the item-reordering context. However, as previously described the same techniques may be used to determine whether and/or when to send a proactive voice notification related to any content.

Process 300 may begin at action 310, at which a reorder prediction score may be received for a first item. The first item may be an item which a user has previously ordered from an e-commerce service (e.g., within the last week). The reorder prediction score may be the score output by the RTR model, as previously described. The reorder prediction score may represent a probability that the user will reorder the first item within a predefined amount of time (e.g., within the next seven days).

Process 300 may continue at action 312, at which item features may be determined for the first item and user features related to past proactive voice notifications sent to the first user may be determined. Item features may be, for example, data indicating and/or representing previous orders of the item (and timing of orders), data describing the item (e.g., title data, category data, price data, description data, etc.), data describing the user acting on a previous proactive voice notification related to the first item, etc. User features related to past proactive voice notifications may include consumption rates of past proactive voice notifications, a number of notifications sent to the first user, the average RTR score of past notifications, etc. Additional user features and item features are described above (e.g., in reference to Table 1).

Process 300 may continue at action 314, at which the reorder prediction score, the item features, and the user features may be input into a machine learning model. For example, the reorder prediction score, the item features for the first item, and the user features for the first user (and/or numerical representations of the various features) may be input into the adaptive content targeting model 160. At action 316, the machine learning model (e.g., adaptive content targeting model 160) may generate a scaled reorder prediction score. For example, if the various features indicate that the user is highly likely to act on a proactive voice notification related to the first item (e.g., based on past user actions/reorders related to the first item and/or in relation to past proactive voice notifications related to the first item), the reorder prediction score may be scaled up (e.g., increased) by the model indicating a higher likelihood of reorder when a proactive voice notification is sent. It should be appreciated that the item features may be generated for a plurality of different items. Accordingly, in some cases, the content with the highest scaled reorder prediction scores may be selected for a proactive voice notification.

Processing may continue at action 318, at which a determination may be made whether the scaled reorder prediction score output by the machine learning model exceeds a threshold value. In various examples, the threshold may also be scaled by the adaptive content targeting model 160. If the scaled reorder prediction score does not exceed the threshold, no proactive voice notification may be sent to the first user (action 320). Conversely, if the scaled reorder prediction score does exceed the threshold, processing may continue to action 322, at which point notification scheduler model 162 may determine a time slot for the first user during which to send the proactive voice notification related to the first item. The notification scheduler model 162 may take as input the various global and local features related to past times at which proactive voice notifications were sent to, and consumed by, the first user. In various examples, the notification scheduler model 162 may determine a time slot for sending the proactive voice notification during which the user is likely to consume and act on the proactive voice notification.

Processing may continue at action 324, at which a frequency model (e.g., notification frequency model 164) may be used to determine a frequency with which to send voice notifications generally in order to avoid user fatigue and/or annoyance. In various examples, the frequency may be determined based on past voice notification data indicating frequencies associated with the user acting on the proactive voice notification. Processing may continue at action 326, at which a device model (e.g., device selection model 166) may be used to select a device to which to send the proactive voice notification. The device selection model 166 may use presence information, as well as past user interaction data (indicating times at which the first user tends to interact with various devices associated with the first user), to determine to which device to send the proactive voice notification. Although not shown in FIG. 3, the proactive voice notification may thereafter be sent to the selected device.

In some examples, the frequency of proactive voice notifications may be determined independently for different types of notifications and/or for different types of content. For example, proactive voice notifications related to weather may be provided more frequently (without risking user annoyance) relative to proactive voice notifications related to reordering items from the user's past order history. In other examples, frequency may be determined individually for each proactive voice notification and/or for each different content item.

Additional examples of data that may be used for device targeting (e.g., to select the device to which to send the proactive voice notification) may include device names and/or location (e.g., sending notifications related to food to a device named "dining room" or a device located in a kitchen and sending traffic-related notifications to a device located in a vehicle). Additionally, presence information along with timing information may be used to target a device. For example, voice notifications at 7:45 am may be sent to a kitchen device, while voice notifications after 6 pm may be sent to living room device, based on user presence information. In some examples, a device's properties (with/without screen, screen size, touch, voice interface) and/or how the user interacts with these properties on each device may be used to determine the appropriate device to which to send a proactive voice notification. In other examples, past user interaction data with devices may be used by the device selection model 166 to learn who is expected to be in a given location at a given time. Accordingly, the most relevant proactive voice notifications for a given user may be sent to the target device at the target location in advance.

Figure 4:
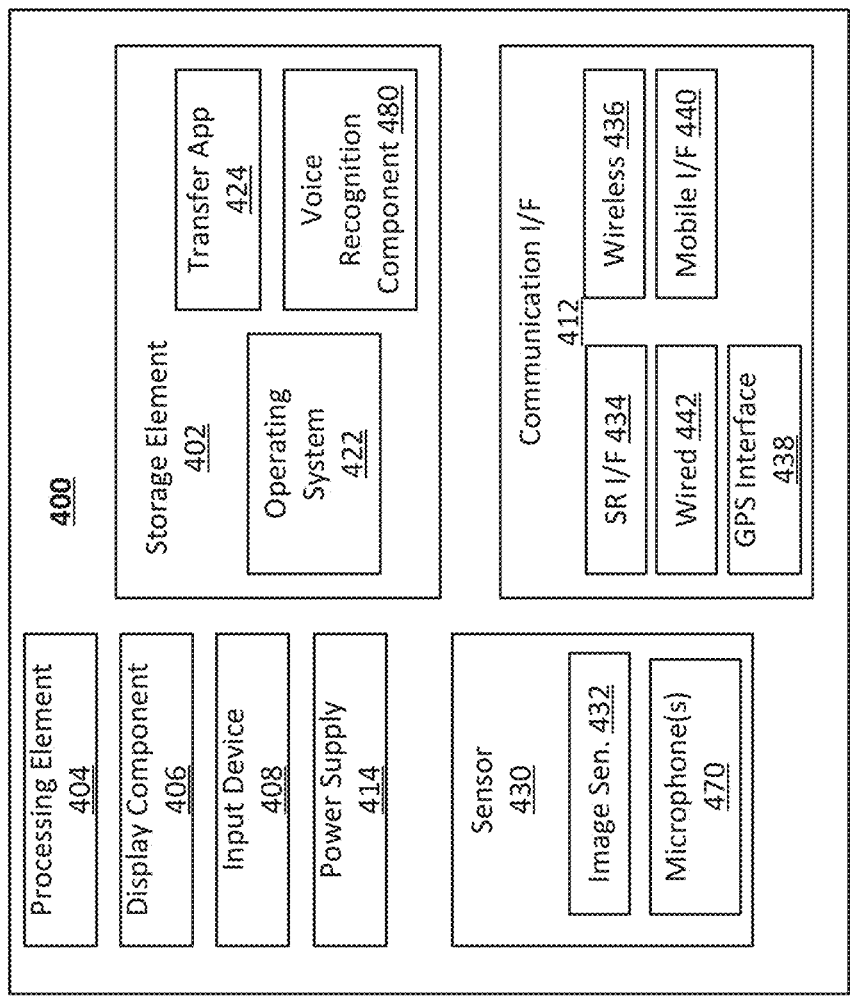
FIG. 4 is a block diagram showing an example architecture of a network-connected device that may be used in accordance with various embodiments described herein.

FIG. 4 is a block diagram showing an example architecture 400 of a network-connected device (e.g., a natural language processing-enabled device such as first voice-enabled device 102) that may be used to implement, at least in part, a speech processing-enable device configured to receive spoken and/or other natural language input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device. In some examples, the display component 406 and/or one or more speakers (not shown) may be effective to output an indication that unconsumed notifications (e.g., voice notifications) are pending. In some cases, there may be an indicator light effective to provide such an indication. In addition, speakers of the architecture 400 may output the voice notification audio upon receiving a user command to consume or "read" the voice notifications.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
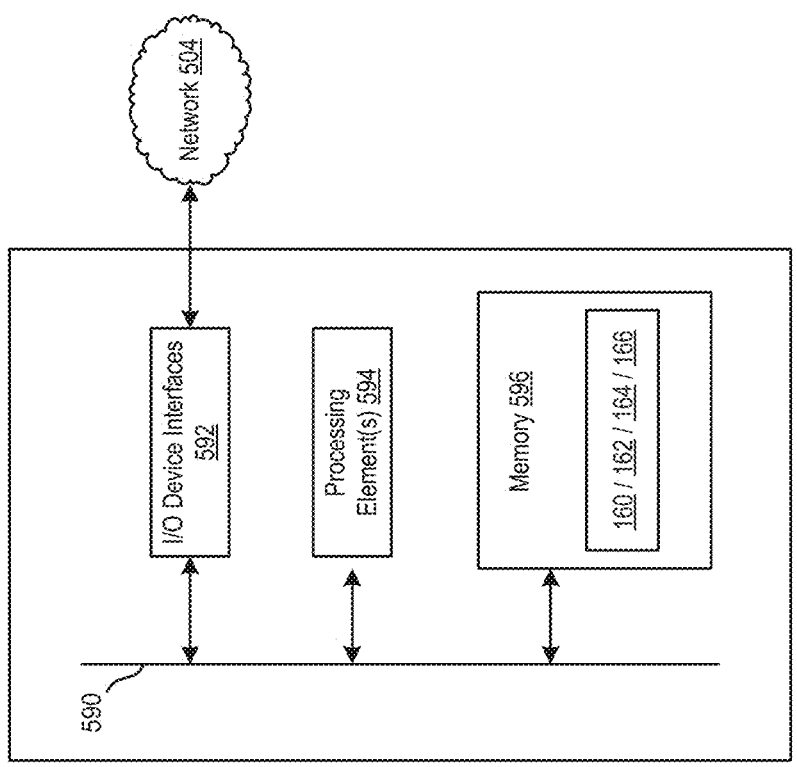
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, task data service is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
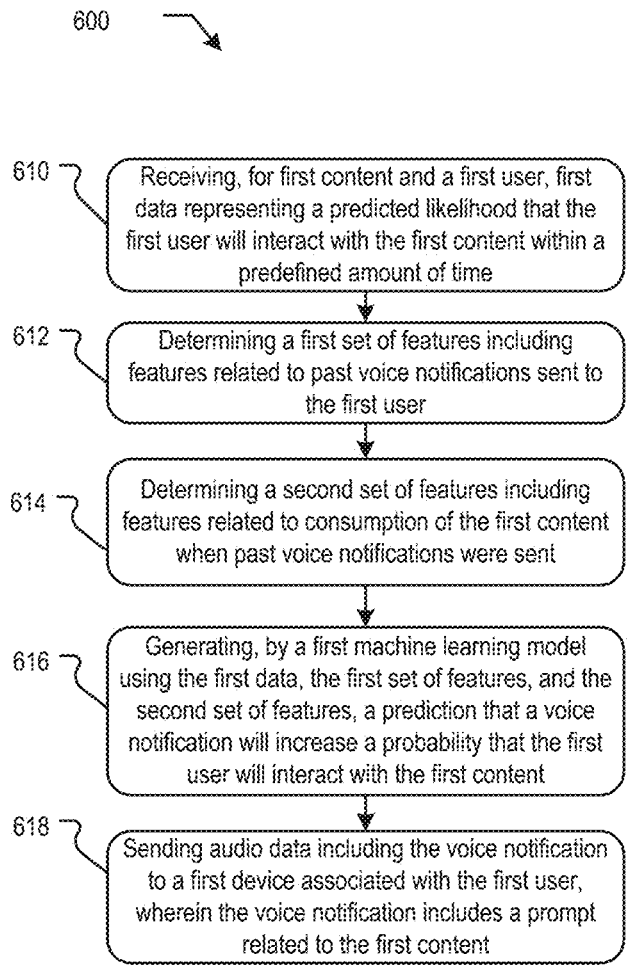
FIG. 6 depicts a flow chart showing an example process for adaptive content targeting for voice notifications, in accordance with various aspects of the present disclosure.

FIG. 6 depicts a flow chart showing an example process 600 for adaptive content targeting for voice notifications, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which first data, for first content and a first user, may be received. The first data may represent a predicted likelihood that the first user will interact with the first content (e.g., provide instructions effective to output the first content, order the first content, act on the first content, etc.) within a predefined amount of time. For example, the predicted likelihood may be a score output by the RTR model indicating a probability that the first user will reorder a first item within the predefined amount of time.

Processing may continue at action 612, at which a first set of features including features related to past voice notifications sent to the first user may be determined. The first set of features may include a number of voice notifications sent to the first user, a number of voice notifications consumed by the first user, a consumption rate of voice notifications sent to the first user, an average RTR score (or other prediction score) of voice notifications sent to the first user, an APR of voice notifications sent to and/or consumed by the first user, etc. Various other example user features are described above.

Processing may continue at action 614, at which a second set of features may be determined. The second set of features may include features related to interaction with the first content when past voice notifications were sent. For example, the second set of features may include features indicating actions related to the first content that are attributable to past proactive voice notifications. In another example, the second set of features may include features indicating past actions related to the first content when the user did not consume a voice notification sent to the user. Various other content features are described above. Generally, the content features relate to past actions related to the content (e.g., requests to output the content, order the content, etc.), or lack thereof, when voice notifications related to the content were sent (or not sent) and were consumed (or were not consumed).

Processing may continue at action 616, at which a first machine learning model may be used to generate a prediction that a voice notification will increase a probability that the first user will interact with the first content. In various examples, the first machine learning model may determine the prediction using the first data (e.g., the RTR score), the first set of features (e.g., user features), and the second set of features (e.g., item features). The first machine learning model may be the adaptive content targeting model 160. In various examples, the prediction may include a scaled prediction score that is adjusted by the adaptive content targeting model 160.

Processing may continue to action 618, at which audio data that includes the voice notification may be sent to a first device associated with the first user. The voice notification may include a prompt related to interaction with the first content. For example, the voice notification may be sent to a voice-enabled device (e.g., first voice-enabled device 102 or second voice-enabled device 105 of FIG. 1) that is associated with the first user by the first user's account data. The voice notification may be a prompt to reorder the first content and/or output the first content (depending on the context) based on the scaled score output by the adaptive content targeting model 160 (e.g., based on a comparison of the scaled score to a threshold).

Figure 7:
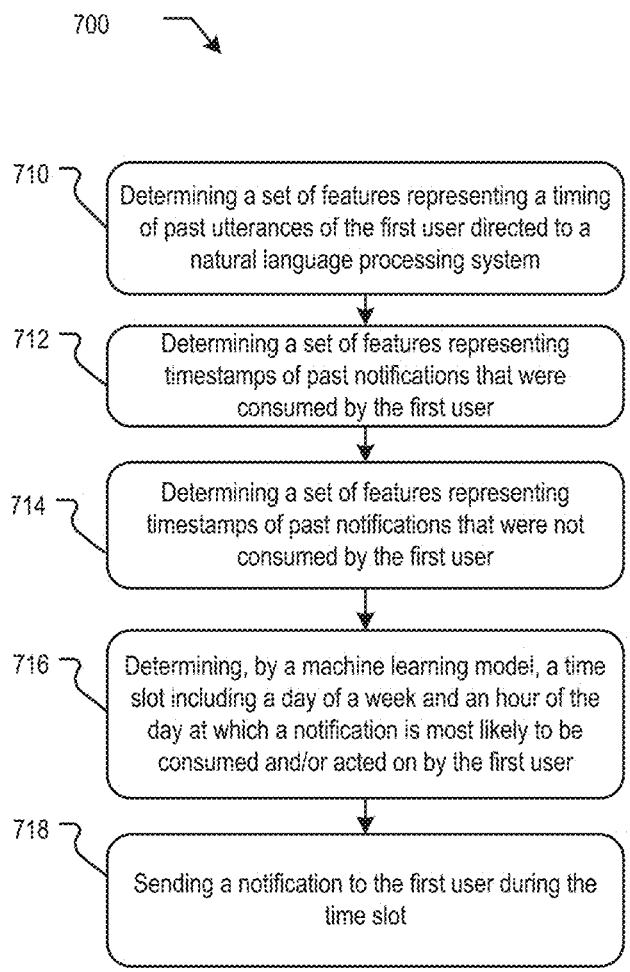
FIG. 7 depicts a flow chart showing an example process for adaptive scheduling of voice notifications, in accordance with various aspects of the present disclosure.

FIG. 7 depicts a flow chart showing an example process 700 for adaptive scheduling of voice notifications, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 710, at which a set of features representing a timing of past utterances of the first user that are directed to a natural language processing system may be determined. For example, the set of features may include timestamps associated with past user utterances that are directed to natural language processing system 220.

Processing may continue at action 712, at which a set of features representing timestamps of past notifications that were consumed by the first user may be determined. For example, past voice notifications that were sent to the user. The set of features may include the timestamps indicating the time at which the user consumed the voice notifications (e.g., the time at which the user requested that the voice notifications be played), and/or the time at which the voice notifications which were ultimately consumed by the first user were sent to the first user.

Processing may continue at action 714, at which a set of features representing timestamps of past notifications that were not consumed by the first user may be determined. The set of features may include the timestamps indicating the time at which voice notifications were sent that were not consumed by the first user. It should be appreciated that other features may be used by the notification scheduler model 162, and that the foregoing examples are merely illustrative of the type of features that may be consumed by the model.

Processing may continue at action 716, at which a machine learning model may determine a time slot including a day of a week and an hour of the day at which a notification is most likely to be consumed and/or acted on by the first user. At action 716, the notification scheduler model 162 may generate a prediction that comprises a time slot that is predicted to maximize one or more objectives for which the notification scheduler model 162 has been trained. In the various examples described above, the notification scheduler model 162 has been trained to maximize the likelihood that a user will consume a voice notification. However, as previously described, other objectives may be used in addition to, or instead of, maximizing the "consume" likelihood of voice notifications. For example, the reorder likelihood may be maximized, a user frustration score (e.g., quantified using negative intents expressed by the user, etc.) may be minimized. Processing may continue at action 718, at which a notification may be sent to the first user during the time slot predicted at action 716.

Figure 8:
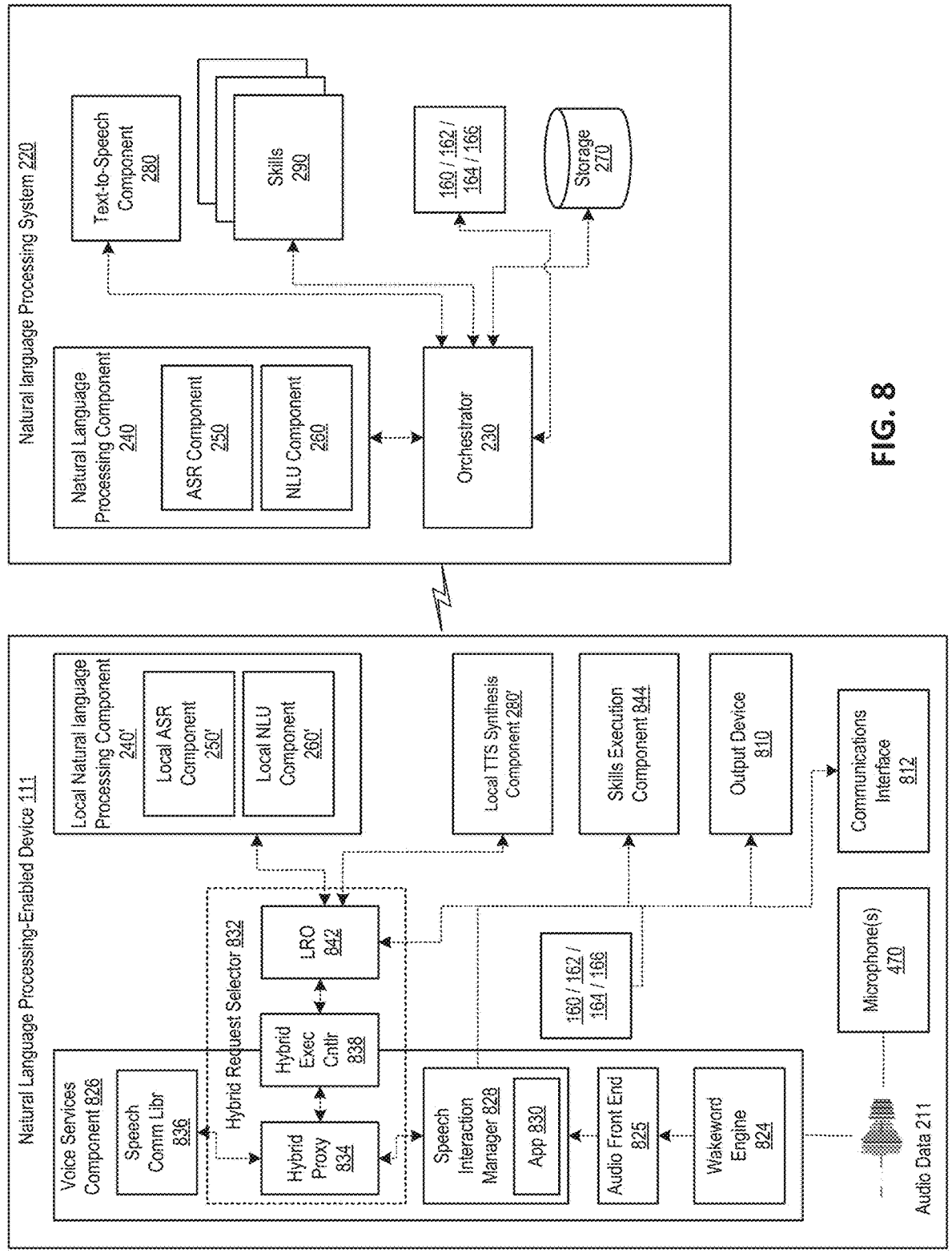
FIG. 8 is a block diagram illustrating a natural language processing-enabled device and a natural language processing management system, in accordance with embodiments of the present disclosure.

FIG. 8 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the voice-enabled devices described herein that are local to (e.g., communicating on the same LAN) network-connected devices communicating via network 104. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 810 (e.g., speakers, displays, and/or other IoT devices among network-connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with the various machine learning models (e.g., models 160, 162, 164, 166). Accordingly, the device 111 may be used to determine whether proactive voice notifications should be sent, a timing of such voice notifications, a frequency of such voice notifications, and/or a device to which to send such voice notifications.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 812) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 810 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 810 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 826. When a user utterance including the wakeword is captured by the microphone 470 of the device 111, the audio data 211 representing the utterance is received by a wakeword engine 824 of the voice services component 826. The wakeword engine 824 may be configured to compare the audio data 211 to stored models used to detect a wakeword (e.g., "Computer") that indicates to the device 111 that the audio data 211 is to be processed for determining an intent. Thus, the wakeword engine 824 is configured to determine whether a wakeword is detected in the audio data 211, and, if a wakeword is detected, the wakeword engine 824 can proceed with routing the audio data 211 to an audio front end (AFE) 825 (sometimes referred to as an acoustic front end (AFE)) of the voice services component 826. If a wakeword is not detected in the audio data 211, the wakeword engine 824 can refrain from sending the audio data 211 to the AFE 825, thereby preventing the audio data 211 from being further processed. The audio data 211 can be discarded.

The AFE 825 is configured to transform the audio data 211 received from the wakeword engine 824 into data for processing by a suitable ASR component and/or NLU component. The AFE 825 may reduce noise in the audio data 211 and divide the digitized audio data 211 into frames representing a time intervals for which the AFE 825 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 825 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 825 in beamforming, may be determined based on results of the wakeword engine 824's processing of the audio data 211. For example, the wakeword engine 824 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 828 of the voice services component 826 may receive the audio data 211 that has been processed by the AFE 825. The SIM 828 may manage received audio data 211 by processing request data and non-speech noise or sounds as events, and the SIM 828 may also manage the processing of commands that are used to respond to the user speech or non-speech noise or sounds (e.g., by controlling the action(s) of natural language processing components of device 111). The SIM 828 may include one or more client applications 830 for performing various functions at the device 111.

A hybrid request selector component 832 of the device 111 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 220. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 220 can be sent to the HEC 838 using the HP 834, which sits in the path between the SCL 836 and the SIM 828. The HP 834 may also be configured to allow audio data 211 received from the SIM 828 to pass through to the natural language processing system 220 (via the SCL 836) while also receiving (e.g., intercepting) this audio data 211 and sending the received audio data 211 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 832 may further include a local request orchestrator component (LRO) 842. The LRO 842 is configured to notify the local natural language processing component 240' about the availability of new audio data 211 that represents user speech, and to otherwise initiate the operations of the local natural language processing component 240' when new audio data 211 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 842 may interact with a skills execution component 844 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 824, which detects the wakeword "Computer," and forwards the audio data 211 to the SIM 828 via the AFE 825 as a result of detecting the wakeword. The SIM 828 may send the audio data 211 to the HP 834, and the HP 834 may allow the audio data 211 to pass through to the natural language processing system 220 (e.g., via the SCL 836), and the HP 834 may also input the audio data 211 to the local natural language processing component 240' by routing the audio data 211 through the HEC 838 of the hybrid request selector 832, whereby the LRO 842 notifies the local natural language processing component 240' of the incoming audio data 211. At this point, the hybrid request selector 832 may wait for response data from the natural language processing system 220 and/or the local natural language processing component 240'.

The local natural language processing component 240' is configured to receive the audio data 211 from the hybrid request selector 832 as input, to recognize speech (and/or non-speech audio events) in the audio data 211, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical Artist]", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, one or more of the adaptive content targeting model 160, the notification scheduler model 162, the notification frequency model 164, and/or the device selection model 166 may be instantiated as a part of the natural language processing system 220 and/or as a separate component configured in communication with the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, for a first item and a first user, first data comprising a first score representing a predicted likelihood that the first user will order the first item within a predefined amount of time;
   determining a first set of features comprising features related to past voice notifications sent to the first user, past voice notifications consumed by the first user, and past orders of items associated with corresponding past voice notifications consumed by the first user;
   determining a second set of features comprising features related to orders of the first item when a voice notification corresponding to an order of the first item was sent and orders of the first item when a voice notification corresponding to the order of the first item was not sent;
   generating, by a first machine learning model, a first scaled score using the first score, the first set of features, and the second set of features;
   determining, based on the first scaled score, that a first voice notification is to be sent to a device;
   generating a first activity map comprising a first number of columns representing respective time slots and a first number of rows representing respective weeks, wherein a value of a first cell of the first activity map represents a first number of occurrences of a first event type during a first time slot and a first week associated with the first cell;
   generating, by inputting the first activity map into a convolutional neural network comprising at least a first convolutional layer and a first pooling layer, first feature data comprising a down-sampled representation of the first activity map;
   generating, by at least one fully-connected classification layer using the first feature data, a first vector, wherein each element of the first vector corresponds to a respective time slot, and wherein a respective value of each element of the first vector represents a respective predicted probability that an event of the first event type will occur if the first voice notification is sent to the device during the respective time slot;
   selecting a second time slot of the first vector based on a first predicted probability associated with the second time slot in the first vector; and
   sending audio data comprising the first voice notification to the device associated with the first user during the second time slot, wherein the first voice notification includes a prompt to remind the first user to reorder the first item.

2. The method of claim 1, further comprising:
   determining a second activity map comprising a third set of features representing a timing of past utterances of the first user directed to a natural language processing system;
   determining a third activity map comprising a fourth set of features representing a timing at which a first subset of the past voice notifications sent to the first user were sent, wherein the first subset of the past voice notifications were consumed;

determining a fourth activity map comprising a fifth set of features representing a timing at which a second subset of the past voice notifications sent to the first user were sent, wherein the second subset of the past voice notifications were not consumed;

determining, by the convolutional neural network, a third time slot comprising a day of a week and an hour of the day, wherein the convolutional neural network determines the third time slot using at least the third set of features, the fourth set of features, and the fifth set of features; and sending second audio data comprising a second voice notification to the device during the third time slot.

3. The method of claim 1, further comprising:

determining, by a sensor associated with the device associated with the first user, second data indicating a presence of the first user at a location proximate to the device; and selecting the device for outputting the audio data from among other devices associated with the first user based on the second data indicating the presence of the first user.

4. A method comprising:

receiving, for first content and a first user, first data representing a predicted likelihood that the first user will interact with the first content within a predefined amount of time;

determining a first set of features comprising features related to past voice notifications sent to the first user;

determining a second set of features comprising features related to interaction with the first content when one of the past voice notifications corresponding to the first content was sent;

generating, by a first machine learning model based at least in part on the first data, the first set of features, and the second set of features, a prediction that a voice notification will increase a probability that the first user will interact with the first content;

generating a first activity map comprising a first number of columns and a first number of rows, wherein a first cell at a first intersection of a first column and a first row corresponds to a first time slot during a first week, wherein a value of the first cell represents a first number of occurrences of a first event type during the first time slot and the first week;

generating, by inputting the first activity map into a convolutional neural network comprising at least a first convolutional layer and a first pooling layer, first feature data comprising a down-sampled representation of the first activity map;

generating, by at least one classification layer using the first feature data, a first vector, wherein a first element of the first vector corresponds to a second time slot, and wherein a value of the first element represents a predicted probability that an event of the first event type will occur if the voice notification is sent to a first device during the second time slot;

selecting the second time slot based on the predicted probability associated with the second time slot in the first vector; and sending audio data comprising the voice notification to the first device during the second time slot, wherein the voice notification includes a prompt related to the first content.

5. The method of claim 4, further comprising:

determining a first feature representing a subset of the past voice notifications that were consumed by the first user; and determining a second feature representing a subset of the past voice notifications that were not consumed by the first user, wherein the first set of features comprises the first feature and the second feature.

6. The method of claim 4, further comprising determining a first feature representing a subset of the past voice notifications that were consumed and which were associated with past interaction with content.

7. The method of claim 4, further comprising:

determining a first feature representing orders associated with past voice notifications that were consumed by the first user; and determining a second feature representing orders associated with past voice notifications that were not consumed by the first user, wherein the second set of features comprise the first feature and the second feature.

8. The method of claim 4, further comprising determining, by the convolutional neural network, a time at which to send the audio data based at least in part on a timing of a subset of the past voice notifications that were consumed by the first user.

9. The method of claim 4, further comprising determining, by the convolutional neural network, a time at which to send the audio data based at least in part on historical data indicating one or more times-of-day associated with the first user interacting with a natural language processing system.

10. The method of claim 4, further comprising:

determining a third set of features representing a first frequency at which the past voice notifications were sent; and determining, by a second machine learning model, a second frequency with which to send voice notifications based at least in part on the first set of features, the second set of features, and the third set of features.

11. The method of claim 4, further comprising determining, by a second machine learning model, the first device from among other devices based at least in part on presence data indicating detection of the first user by a sensor associated with the first device.

12. The method of claim 11, further comprising determining, by a third machine learning model a first time of day at which to send the audio data to the first device based at least in part on historical data indicating times at which the first user has historically consumed voice notifications.

13. A system comprising:

at least one processor; and non-transitory computer-readable memory storing instructions that, when executed by the at least one processor, are effective to:

receive, for first content and a first user, first data representing a predicted likelihood that the first user will interact with the first content within a predefined amount of time;

determine a first set of features comprising features related to past voice notifications sent to the first user;

determine a second set of features comprising features related to interaction with the first content when one of the past voice notifications corresponding to the first content was sent;

generate, by a first machine learning model based at least in part on the first data, the first set of features, and the second set of features, a prediction that a voice notification will increase a probability that the first user will interact with the first content;

generating a first activity map comprising a first number of columns and a first number of rows, wherein a first cell at a first intersection of a first column and a first row corresponds to a first time slot during a first week, wherein a value of the first cell represents a first number of occurrences of a first event type during the first time slot and the first week;

generating, by inputting the first activity map into a convolutional neural network comprising at least a first convolutional layer and a first pooling layer, first feature data comprising a down-sampled representation of the first activity map;

generating, by at least one classification layer using the first feature data, a first vector, wherein a first element of the first vector corresponds to a second time slot, and wherein a value of the first element represents a predicted probability that an event of the first event type will occur if the voice notification is sent to a first device during the second time slot;

selecting the second time slot based on the predicted probability associated with the second time slot in the first vector; and send audio data comprising the voice notification to the first device during the second time slot, wherein the voice notification includes a prompt related to the first content.

14. The system of claim 13, the non-transitory computer-readable memory storing further instructions that, when executed by the at least one processor, are further effective to:

determine a first feature representing a subset of the past voice notifications that were consumed by the first user; and determine a second feature representing a subset of the past voice notifications that were not consumed by the first user, wherein the first set of features comprises the first feature and the second feature.

15. The system of claim 14, the non-transitory computer-readable memory storing further instructions that, when executed by the at least one processor, are further effective to determine a first feature representing a subset of the past voice notifications that were consumed and which were associated with past interaction with content.

16. The system of claim 13, the non-transitory computer-readable memory storing further instructions that, when executed by the at least one processor, are further effective to:

determine a first feature representing orders associated with past voice notifications that were consumed by the first user; and determine a second feature representing orders associated with past voice notifications that were not consumed by the first user, wherein the second set of features comprise the first feature and the second feature.

17. The system of claim 13, the non-transitory computer-readable memory storing further instructions that, when executed by the at least one processor, are further effective to:

determine, by the convolutional neural network, a time at which to send the audio data based at least in part on a timing of a subset of the past voice notifications that were consumed by the first user.

18. The system of claim 13, the non-transitory computer-readable memory storing further instructions that, when executed by the at least one processor, are further effective to:

determine, by the convolutional neural network, a time at which to send the audio data based at least in part on historical data indicating one or more times-of-day associated with the first user interacting with a natural language processing system.

19. The system of claim 13, the non-transitory computer-readable memory storing further instructions that, when executed by the at least one processor, are further effective to:

determine a third set of features representing a first frequency at which the past voice notifications were sent; and determine, by a second machine learning model, a second frequency with which to send voice notifications based at least in part on the first set of features, the second set of features, and the third set of features.

20. The system of claim 13, the non-transitory computer-readable memory storing further instructions that, when executed by the at least one processor, are further effective to:

determine, by a second machine learning model, the first device from among other devices based at least in part on presence data indicating detection of the first user by a sensor associated with the first device; and determine, by a third machine learning model a first time of day at which to send the audio data to the first device based at least in part on historical data indicating times at which the first user has historically consumed voice notifications.

* * * * *